US010878526B2

(12) United States Patent
Itagaki et al.

(10) Patent No.: US 10,878,526 B2
(45) Date of Patent: Dec. 29, 2020

(54) IMAGE PROCESSING APPARATUS, IMAGE PROCESSING METHOD, AND IMAGE PROCESSING PROGRAM

(71) Applicants: FUJIFILM CORPORATION, Tokyo (JP); FUJI XEROX CO., LTD., Tokyo (JP)

(72) Inventors: Kazuyuki Itagaki, Kanagawa (JP); Kosei Takemoto, Kanagawa (JP); Takashi Nagao, Kanagawa (JP)

(73) Assignees: FUJIFILM CORPORATION, Tokyo (JP); FUJI XEROX CO., LTD., Tokyo (JP)

( * ) Notice: Subject to any disclaimer, the term of this patent is extended or adjusted under 35 U.S.C. 154(b) by 85 days.

(21) Appl. No.: 16/134,973

(22) Filed: Sep. 19, 2018

(65) Prior Publication Data

US 2019/0019269 A1    Jan. 17, 2019

Related U.S. Application Data

(63) Continuation of application No. PCT/JP2017/002574, filed on Jan. 25, 2017.

(30) Foreign Application Priority Data

Mar. 24, 2016    (JP) .................. 2016-060524

(51) Int. Cl.
*G06T 1/20*    (2006.01)
*G06F 9/50*    (2006.01)
*G06T 1/60*    (2006.01)

(52) U.S. Cl.
CPC .................. *G06T 1/20* (2013.01); *G06F 9/50* (2013.01); *G06T 1/60* (2013.01)

(58) Field of Classification Search
CPC .. G06T 1/20; G06T 1/60; G06T 17/05; G06T 19/20; G06T 11/60; G06F 12/0875;
(Continued)

(56) References Cited

U.S. PATENT DOCUMENTS

2007/0038987 A1    2/2007 Ohara et al.
2015/0046678 A1*   2/2015 Moloney ................... G06T 1/60
                                                                                712/29
(Continued)

FOREIGN PATENT DOCUMENTS

JP    2007-48052 A    2/2007
JP    2007-323393 A   12/2007
(Continued)

OTHER PUBLICATIONS

International Search Report issued in International Application No. PCT/JP2017/002574 dated Mar. 7, 2017.
(Continued)

*Primary Examiner* — Xilin Guo
(74) *Attorney, Agent, or Firm* — Solaris Intellectual Property Group, PLLC

(57) ABSTRACT

An image processing apparatus that performs a partial process with respect to each piece of divided image data obtained by dividing an input image expressed by input image data into partial regions using each object of an object group in which plural objects for executing image processing are connected to each other in a directed acyclic graph form, including: an assignment section that assigns a dependency relationship of processes to the partial processes between the connected the objects and assigns a priority to each partial process; a registration section that arranges executable partial processes on the basis of the dependency relationship in accordance with the assigned priorities and registers the result in an executable partial process list; and
(Continued)

an execution section that executes the partial processes in a descending order of the priorities in the executable partial process list registered by the registration section.

6 Claims, 9 Drawing Sheets

(58) Field of Classification Search
CPC .... G06F 9/50; G06F 16/90339; G06F 1/3231; G06F 1/3293; G06F 16/9024; G06F 9/463; G06F 9/485; G06F 9/5016; G09G 5/363
See application file for complete search history.

(56) References Cited

U.S. PATENT DOCUMENTS

2016/0267622 A1* 9/2016 Brothers .................. G06T 1/20
2018/0081581 A1* 3/2018 Miyamoto ............ G06F 3/0683

FOREIGN PATENT DOCUMENTS

| | | |
|---|---|---|
| JP | 2009-54001 A | 3/2009 |
| JP | 4491026 B2 | 6/2010 |
| JP | 4694264 B2 | 6/2011 |
| WO | 2010/055719 A1 | 5/2010 |
| WO | 2010/113242 A1 | 10/2010 |

OTHER PUBLICATIONS

Written Opinion of the ISA issued in International Application No. PCT/JP2017/002574 dated Mar. 7, 2017.

* cited by examiner

IMAGE PROCESSING APPARATUS, IMAGE PROCESSING METHOD, AND IMAGE PROCESSING PROGRAM

CROSS-REFERENCE TO RELATED APPLICATIONS

This application is a continuation application of International Application No. PCT/JP2017/002574, filed on Jan. 25, 2017, which is incorporated herein by reference in its entirety. Further, this application claims priority from Japanese Patent Application No. 2016-060524, filed on Mar. 24, 2016, the disclosure of which is incorporated by reference herein in its entirety.

BACKGROUND

Technical Field

A technique of the present disclosure relates to an image processing apparatus, an image processing method, and an image processing program.

Related Art

In the related art, a technique for performing the image processing according to an object group in which a plurality of objects for executing image processing are connected in a directed acyclic graph (DAG) form is known (see JP4694264B).

Further, in a case where a process is executed in accordance with a graph in which a plurality of nodes (tasks) are connected in a DAG form, a technique for searching for a node to be executed next time through a graph in execution of each node is known (see JP4491026B).

Further, in a case where image processing is executed in accordance with an object group in which a plurality of objects for which image processing is executed are connected in a DAG form, a technique for raising a priority of an object disposed on a rear stage side in accordance with the progress of the image processing in execution of the image processing is known (see JP2007-323393A).

However, the technique disclosed in JP4694264B is a technique of sequentially executing processes that are executable in accordance with an object group constructed by an instruction of an application program, for example, and thus, there is a case where the processes are not executed in a descending order of processing efficiency.

Further, in the technique disclosed in JP4491026B, since a node to be executed next time through a graph in execution of each node is searched for, a load of a search process in execution of the process is relatively high, and thus, there is a case where its processing efficiency is reduced.

In addition, even in the technique disclosed in JP2007-323393A, since the priority of the object disposed on the rear stage side is changed in execution of image processing of the object group, a load of a priority change process in execution of the image processing is relatively high, and thus, there is a case where its processing efficiency is reduced.

SUMMARY

The technique of the present disclosure provides an image processing apparatus, an image processing method, and an image processing program capable of, in a case where a plurality of executable processes are present, selecting executable processes while suppressing reduction in processing efficiency.

According to a first aspect of the invention, there is provided an image processing apparatus that performs a partial process with respect to each piece of divided image data obtained by dividing an input image expressed by input image data into partial regions using each object of an object group in which a plurality of objects for executing image processing are connected to each other in a directed acyclic graph form, comprises: an assignment section that assigns a dependency relationship of processes to the partial processes between the connected the objects and assigns a priority to each partial process; a registration section that arranges executable partial processes on the basis of the dependency relationship in accordance with the assigned priorities and registers the result in an executable partial process list; and an execution section that executes the partial processes in a descending order of the priorities in the executable partial process list registered by the registration section.

According to a second aspect of the invention, in the image processing apparatus according to the first aspect, in a case where a partial process of the object connected at a front stage is terminated between the connected objects, the dependency relationship may be a relationship indicating that a partial process of the object connected at a rear stage is executable.

Further, according to a third aspect of the invention, in the image processing apparatus according to the first aspect or the second aspect, the assignment section may assign a higher priority to the partial process executed by the object connected at the rear stage compared with the partial process executed by the object connected at the front stage.

Further, according to a fourth aspect of the invention, in the image processing apparatus according to any one of the first to third aspects, the assignment section may assign a priority based on the priority of the partial process of the object connected at the front stage to the partial process of the object connected at the rear stage, with respect to each partial process having the dependency relationship.

In addition, according to a fifth aspect of the invention, in the image processing apparatus according to any one of the first to fourth aspects, in a case where objects that are executed in parallel are present in the object group, the assignment section may assign priorities having an alternating processing order to partial processes between the objects that are executed in parallel.

Further, according to a sixth aspect of the invention, in the image processing apparatus according to any one of the first to fifth aspects, the divided image data may be image data indicating divided images obtained by dividing the input image in a vertical direction in a front view, and the assignment section may assign a higher priority to a partial process for processing divided image data indicating a divided image disposed in an upper part of an output image in the front view, compared with a partial process for processing divided image data indicating a divided image disposed in a lower part of the output image in the front view.

According to a seventh aspect of the invention, there is provided an image processing method using an image processing apparatus that performs a partial process with respect to each piece of divided image data obtained by dividing an input image expressed by input image data into partial regions using each object of an object group in which a plurality of objects for executing image processing are connected to each other in a directed acyclic graph form, comprising: assigning a dependency relationship of processes to the partial processes between the connected the objects and assigning a priority to each partial process; arranging executable partial processes on the basis of the dependency relationship in accordance with the assigned priorities and registering the result in an executable partial process list; and executing the partial processes in a descending order of the priorities in the executable registered partial process list.

According to an eighth aspect of the invention, there is provided an image processing program for causing a computer to function as the assignment section, the registration section, and the execution section of the image processing apparatus according to any one of the first to sixth aspects of the invention.

According to embodiments of the invention, in a case where a plurality of executable processes are present, it is possible to select executable processes while suppressing a reduction in processing efficiency.

DETAILED DESCRIPTION

Hereinafter, embodiments for executing the technique of the present disclosure will be described in detail with reference to the accompanying drawings.

First, a configuration of a computer 10 that functions as an image processing apparatus will be described with reference to FIG. 1. The computer 10 may be a computer embedded in an image handling device that performs image processing inside a copying machine, a printer, a facsimile machine, a multifunction machine that performs functions of these machines, a scanner, or the like. Further, the computer 10 may be an independent computer such as a personal computer (PC), or may be a computer embedded in a portable device such as a personal digital assistant (PDA) or a mobile phone.

Figure 1:
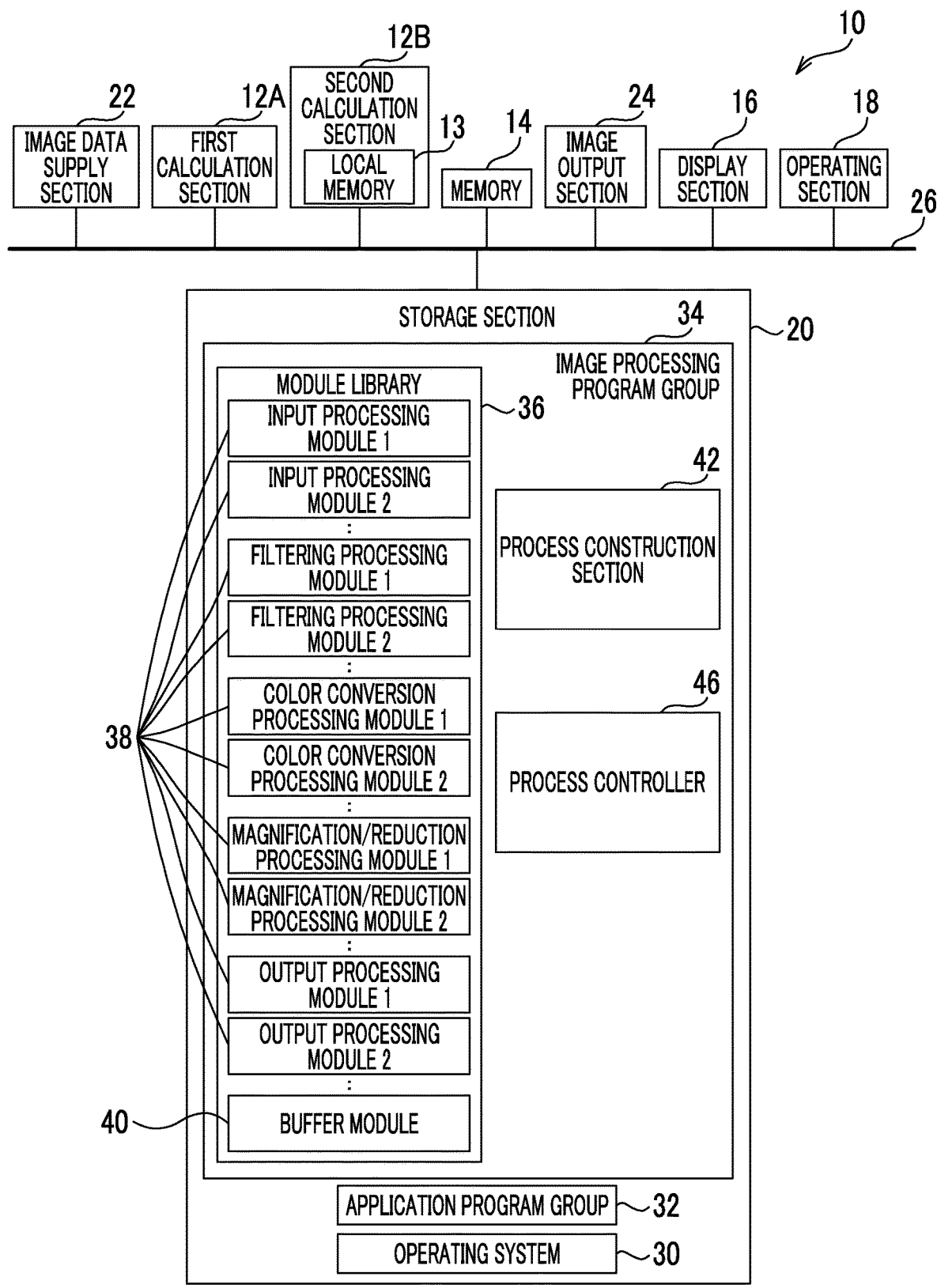
FIG. 1 is a block diagram showing an example of a configuration of a computer that functions as an image processing apparatus according to an embodiment.

As shown in FIG. 1, the computer 10 according to this embodiment includes a first calculation section 12A, a second calculation section 12B, a memory 14, a display section 16, an operating section 18, a storage section 20, an image data supply section 22, and an image output section 24. Further, the respective sections of the first calculation section 12A, the second calculation section 12B, the memory 14, the display section 16, the operating section 18, the storage section 20, the image data supply section 22, and the image output section 24 are connected to each other through a bus 26.

The first calculation section 12A according to this embodiment is a main processor of the computer 10, and for example, is a central processing unit (CPU) having a plurality of processor cores. Further, the second calculation section 12B according to this embodiment is a graphics processing unit (GPU) having a local memory 13 therein, for example. The second calculation section 12B may be the same type of CPU as in the first calculation section 12A, or may be a different type of CPU. Further, the second calculation section 12B may be a GPU provided in the first calculation section 12A. Further, the second calculation section 12B may be a GPU that does not have the local memory 13 therein. In addition, the first calculation section 12A and the second calculation section 12B may be a calculator of a field programmable gate array (FPGA) or the like.

The memory 14 is non-volatile storage means for temporarily storing data in the first calculation section 12A and the second calculation section 12B. In a case where image processing is performed by the second calculation section 12B according to this embodiment, the first calculation section 12A transfers image data stored in the memory 14 or a storage region of the storage section 20 to the second calculation section 12B through the bus 26. Further, the second calculation section 12B stores image data transferred from the first calculation section 12A in the local memory 13, and performs image processing with respect to the stored image data. The second calculation section 12B may directly read out image data stored in the memory 14 or the storage section 20 to perform image processing.

In a case where the computer 10 is embedded in the above-mentioned image handling device, as the display section 16 and the operating section 18, a display panel such as a liquid crystal display (LCD) provided in the image handling device, a numeric keypad, and the like may be employed. Further, in a case where the computer 10 is an independent computer, as the display section 16 and the operating section 18, for example, a display, a keyboard, a mouse, or the like connected to the computer 10 may be employed. In addition, the display section 16 and the operating section 18 may be a touch panel display in which a touch panel and a display are integrally formed, for example. Further, as the storage section 20, a hard disk drive (HDD), a solid state drive (SSD), or a non-volatile storage medium such as a flash memory may be employed.

The image data supply section 22 may be any device that is able to provide image data that is a processing target, which may be, for example, an image reading section that reads out an image recorded on a recording material such as a sheet or a photographic film and outputs image data. Further, as the image data supply section 22, for example, a reception section that receives image data from an external device through a communication line, the image storage section (the memory 14 or the storage section 20) that stores image data, and the like are employed.

The image output section 24 may be any device that is able to output image data obtained through image processing or an image expressed by the image data obtained through the image processing, which may be, for example, an image recording section that records an image expressed by image data on a recording material such as a sheet or a photosensitive material. Further, as the image output section 24, a display section (display section 16) that displays an image expressed by the image data on a display or the like, or a writing device that writes image data on a recording medium such as a compact disc read only memory (CD-ROM) may be employed. Further, as the image output section 24, a transmission section that transmits image data obtained through image processing to an external device through a communication line may be employed. Further, the image output section 24 may be an image storage section (the memory 14 or the storage section 20) that stores image data obtained through image processing.

As shown in FIG. 1, a variety of programs executed by the first calculation section 12A and the second calculation section 12B are stored in the storage section 20. In the storage section 20, a program of an operating system 30 that performs management of resources, management of execution of programs, communication between the computer 10 and the external device, and the like is stored as a part of the variety of programs. Further, in the storage section 20, an image processing program group 34 for causing the computer 10 to function as an image processing apparatus is stored as a part of the variety of programs. Further, in the storage section 20, an application program group 32 (hereinafter, referred to as an "application 32") including a variety of application programs for causing the image processing apparatus to perform desired image processing is stored as a part of the variety of programs.

The image processing program group 34 refers to programs made to reduce burden on developing image processing programs executed by the above-described image handling device, portable device, PC, or the like. Further, the image processing program group 34 refers to programs made to be commonly executable in various devices (platforms) such as the above-described image handling device, portable device, PC, or the like.

The image processing apparatus realized by the image processing program group 34 constructs an image processing DAG 50A (of which details will be described later) that performs image processing instructed by the application 32 in accordance with a construction instruction from the application 32. Further, the image processing apparatus executes processing in the image processing DAG 50A in accordance with an execution instruction from the application 32. Thus, the image processing program group 34 provides an interface for instructing the construction of the image processing DAG 50A for performing desired image processing or instructing the execution of the image processing in the constructed image processing DAG 50A to the application 32.

With such a configuration, for example, in a case where any device that needs to perform image processing therein is newly developed, development of a program for performing the image processing may be performed as described hereinafter. In this case, the application 32 that causes the image processing program group 34 to perform the image processing necessary in the device using the interface may be developed. Accordingly, a developer does not need to newly develop a program for actually performing image processing, which leads to reduction of burden on the developer.

Next, the image processing program group 34 according to this embodiment will be described in detail. As shown in FIG. 1, the image processing program group 34 includes a module library 36, a program of a process construction section 42, and a program of a process controller 46.

In the module library 36, programs of a plurality of types of image processing modules 38 that perform predetermined different types of image processing are registered, respectively. The image processing may include, for example, an input process, a filtering process, a color conversion process, a magnification or reduction process (see a "magnification/reduction process" in FIG. 1), a skew angle detection process, an image rotation process, an image synthesis process, an output process, and the like.

Further, in the module library 36, an image processing module 38 having the same type of image processing and different details of image processing to be executed is also registered. In FIG. 1, such an image processing module is divided into "module 1" and "module 2", which are distinguished from each other using numerical characters attached to the ends thereof. For example, with respect to the image processing module 38 that performs the magnification or reduction process, an image processing module 38 that performs a reduction process of reducing vertical and horizontal sizes of an image by 50% by thinning out input image data every other pixel in respective directions of a horizontal direction and a vertical direction is prepared. Further, for example, with respect to the image processing module 38 that performs the magnification or reduction process, an image processing module 38 that performs a magnification or reduction process at a designated magnification or reduction ratio with respect to input image data is prepared, for example.

Further, for example, with respect to the image processing module 38 that performs the color conversion process, an image processing module 38 that converts an image in an RGB (red, green, blue) color space into an image in a CMYK (cyan, magenta, yellow, key-plate (black)) color space and an image processing module 38 that converts an image in a CMYK color space into an image in an RGB color space are prepared. Further, for example, with respect to the image processing module 38 that performs the color conversion process, an image processing module 38 that converts an image in an RGB color space into an image in a YCbCr color space and an image processing module 38 that converts an image in a YCbCr color space into an image in an RGB color space are prepared, for example.

Further, in the image processing module 38 according to this embodiment, calculation section information indicating which one of the first calculation section 12A and the second calculation section 12B executes each image processing module 38 is included. The calculation section information may be set in advance in accordance with at least one of the type of the image processing module 38 or content of image processing, or may be set in construction of the image processing DAG 50A of the process construction section 42

(which will be described later) in accordance with an instruction from the application 32.

Further, in the module library 36, a buffer module 40 that includes a storage region (buffer) for storing image data is also registered.

The process construction section 42 according to this embodiment constructs the image processing DAG 50A in a DAG form in accordance with an instruction from the application 32. In the image processing DAG 50A, for example, as shown in FIG. 2A, one or more image processing modules 38 are connected to each other through the buffer module 40 disposed in at least one of a front stage and a rear stage of each image processing module 38.

Each image processing module 38 is an example of an object that executes image processing with respect to input image data and outputs output image data. Further, the image processing DAG 50A is an example of an object group in which a plurality of image processing modules 38 are connected to each other. Further, in the example shown in FIG. 2A, it is shown that an image processing module 38 to which another image processing module 38 is connected at a front stage thereof through the buffer module 40 is in a state of being capable of executing its image processing in a case where image processing in the front-stage image processing module 38 is terminated. In addition, it is shown that an image processing module 38 to which a plurality of image processing modules 38 are connected at a front stage thereof through the buffer module 40 is in a state of being capable of executing its image processing in a case where entire image processing in the plurality of front-stage image processing modules 38 is terminated.

Figure 2A:
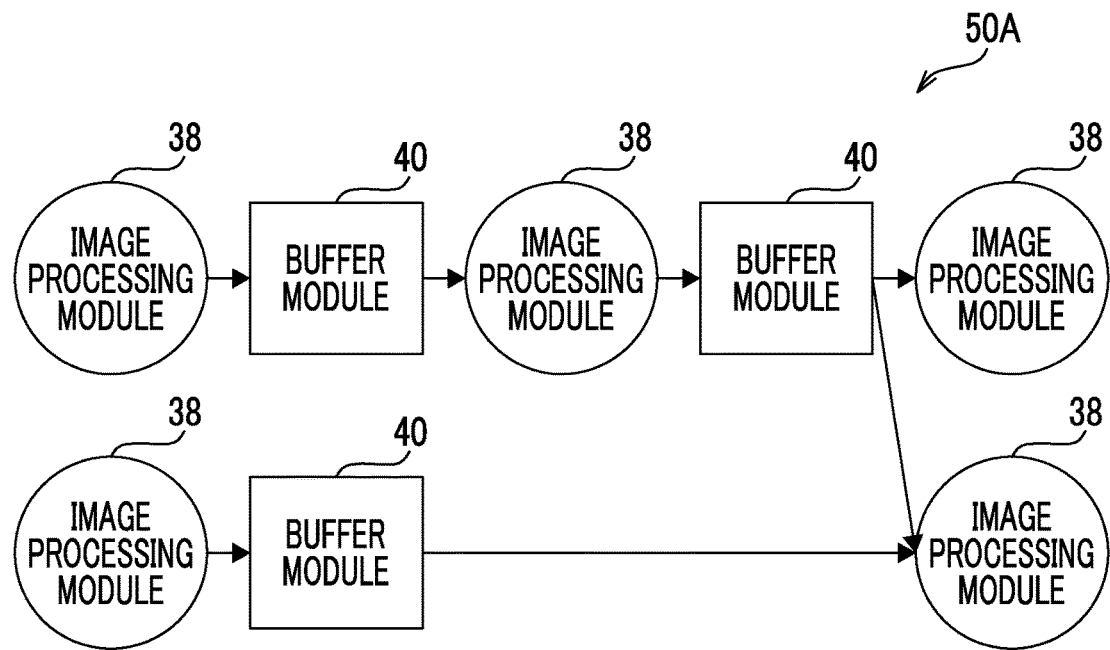
FIG. 2A is a schematic view showing an example of an image processing DAG.
Figure 2B:
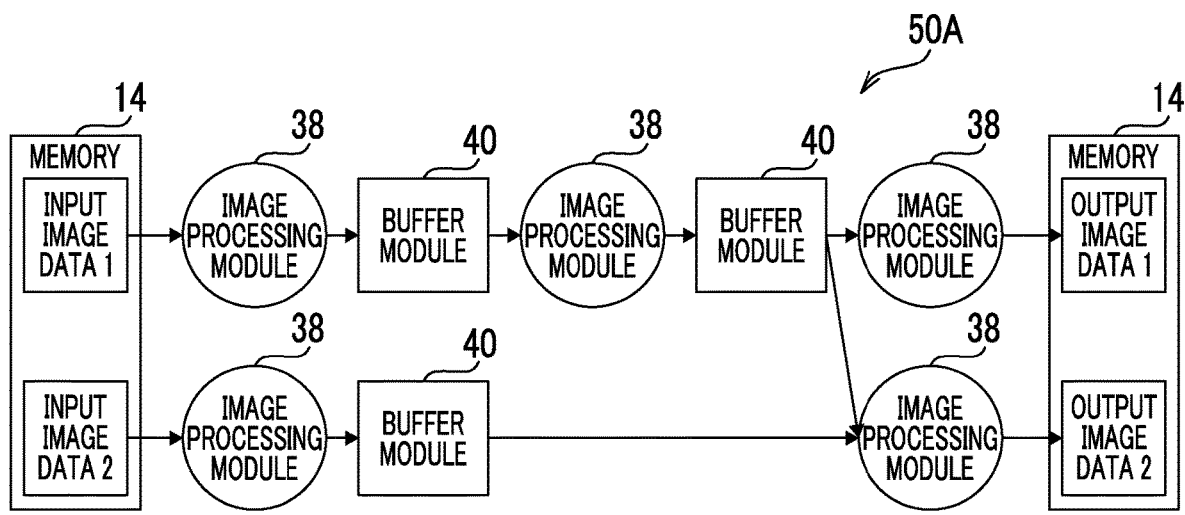
FIG. 2B is a schematic view showing an example in a case where an input/output memory is additionally provided in the image processing DAG.

Further, in FIG. 2A, a DAG in which only the respective modules are connected to each other in a processing order is shown, but in a case where the DAG is actually executed, as shown in FIG. 2B, image data stored in the memory 14 is input and image processing is performed in accordance with the DAG. Finally, a processing result of processed image data or the like is stored in the memory 14. In a case where image processing executed by each image processing module 38 is executed by the second calculation section 12B, the memory 14 shown in FIG. 2B becomes the local memory 13.

Figure 3:
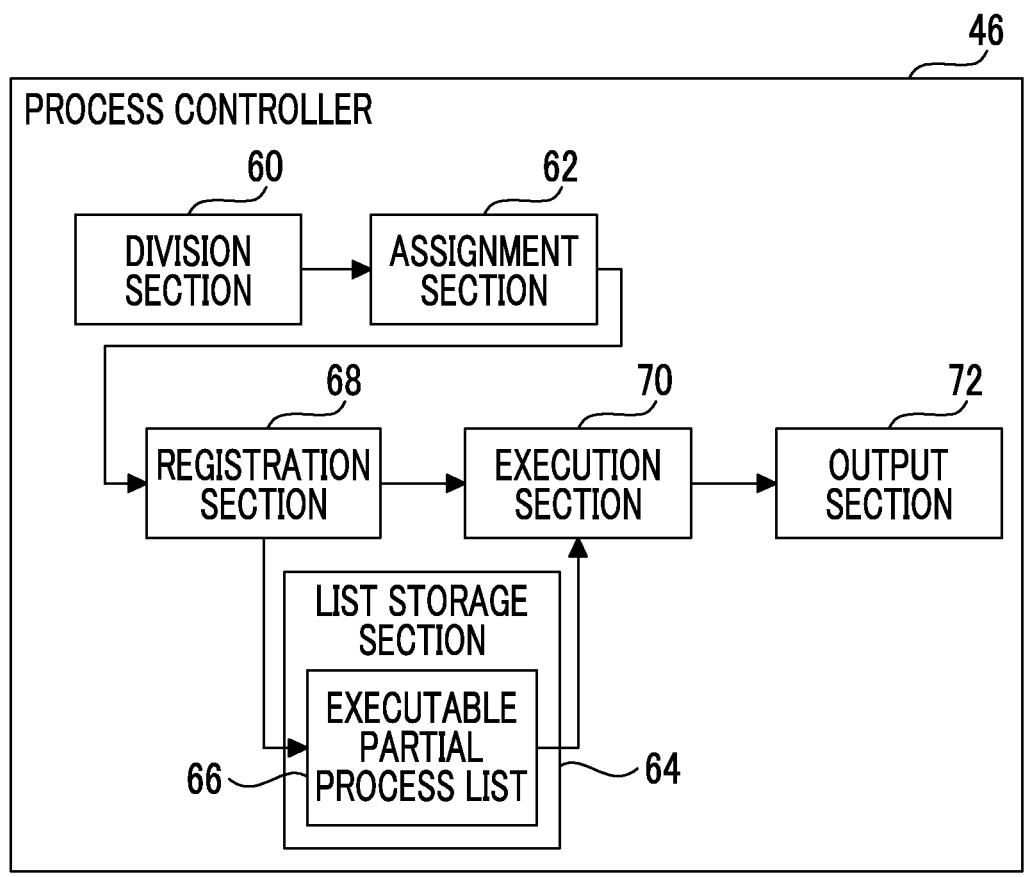
FIG. 3 is a block diagram showing an example of a functional configuration of a process controller according to an embodiment.

Next, a functional configuration of the process controller 46 according to this embodiment will be described with reference to FIG. 3. As shown in FIG. 3, the process controller 46 includes a division section 60, an assignment section 62, a list storage section 64, a registration section 68, an execution section 70, and an output section 72.

Figure 4A:
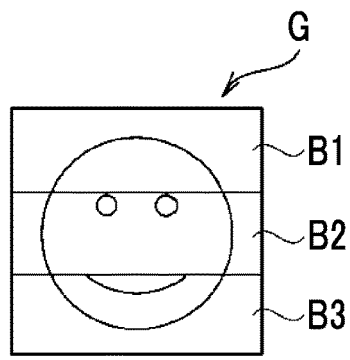
FIG. 4A is a schematic view for illustrating an example of a division process of an input image.

The division section 60 according to this embodiment divides an image expressed by a part of input image data that is a processing target into a plurality of partial regions (hereinafter, referred to as "divided images"). For example, as shown in FIG. 4A, the division section 60 divides an image G expressed by a part of input image data that is a processing target into a plurality of (in the example shown in FIG. 4A, three) divided images B1 to B3. Hereinafter, image data indicating divided images is referred to as "divided image data". Further, with respect to the part of the input image data that is the processing target, in the case of image processing in which an entire input image is a processing target as in a color conversion process, the entire input image data becomes the part that is the processing target. In addition, in the case of image processing in which a part of an input image is a processing target as in a trimming process, the part of the input image data that is the processing target becomes the part of the input image. Hereinafter, for ease of description, the part of the input image data that is the processing target is simply referred to as "input image data".

Figure 4B:
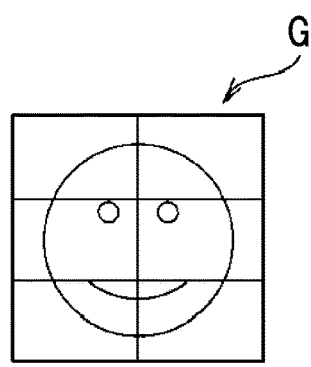
FIG. 4B is a schematic view for illustrating another example of the division process of the input image.

Further, in the example shown in FIG. 4A, the division section 60 divides the image G in a vertical direction in a front view, but is not limited thereto. For example, the division section 60 may divide the image G in a horizontal direction in a front view, or in horizontal and vertical directions in a front view, as shown in FIG. 4B.

The number of divisions of input image data in the division section 60 is not particularly limited. For example, the division section 60 may divide input image data with a predetermined number or size. Further, for example, the division section 60 may divide input image data with a number that is equal to or smaller than the number of processor cores included in a calculation section that executes image processing in the image processing module 38 and is equal to or larger than 2.

For example, the division section 60 divides input image data having a size that is equal to or smaller than a capacity of a cache memory included in a calculation section that executes image processing in the image processing module 38. In this case, a configuration in which the division section 60 divides input image data to have a capacity that is equal to or smaller than a cache memory having a level that is most distant from a processor of the calculation section that executes the image processing in the image processing module 38, that is, a so-called last level cache (LLC) and a size that matches the capacity of the LLC to the utmost is used.

Figure 5:
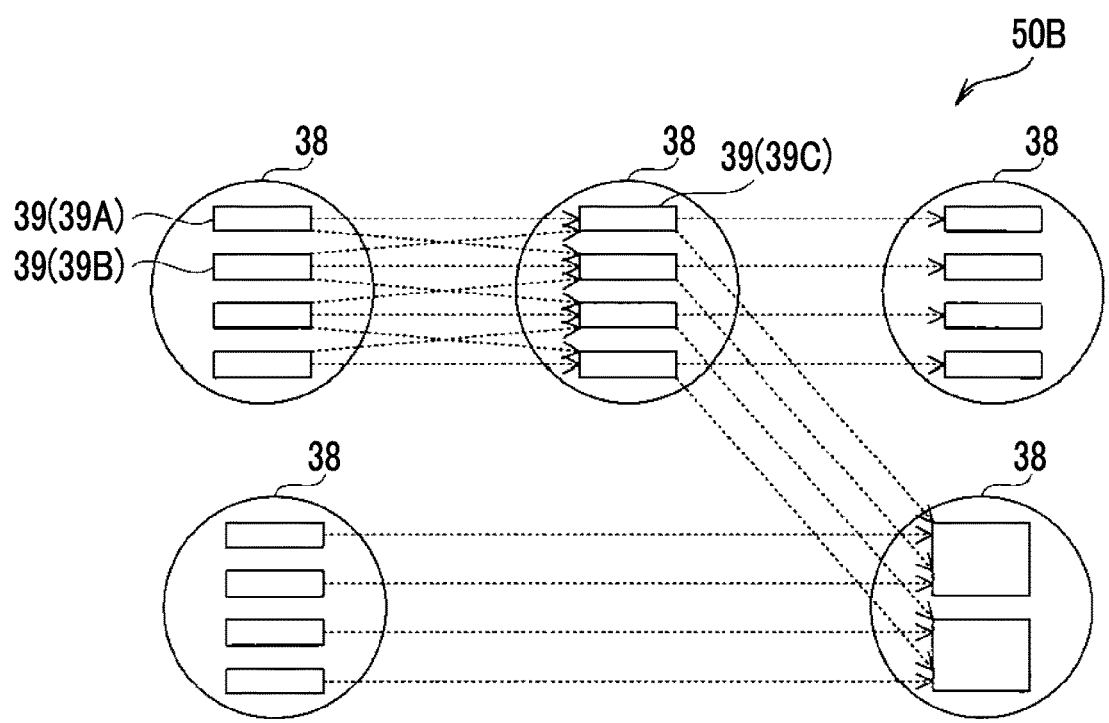
FIG. 5 is a schematic view showing an example of an image processing DAG in which an image processing module is divided into partial processes.

Further, for example, as shown in FIG. 5, the division section 60 divides image processing executed by each image processing module 38 into partial processes 39 (tasks) corresponding to each piece of divided image data with respect to the image processing DAG 50A to construct an image processing DAG 50B. FIG. 5 shows the image processing DAG 50B in a case where input image data is divided into four pieces of divided image data in the image processing DAG 50A shown in FIG. 2A. For ease of description, in FIG. 5, the buffer module 40 is not shown. Further, similarly, in FIGS. 6 and 9 (which will be described later), the buffer module 40 is not shown.

The assignment section 62 according to this embodiment assigns a dependency relationship between a partial process 39 of the image processing module 38 connected at a front stage and a partial process 39 of the image processing module 38 connected at a rear stage, in accordance with the type of image processing executed by the image processing module 38. In FIG. 5, the dependency relationship is indicated by a dashed arrow.

For example, in a process of performing image processing only with respect to a pixel that is a processing target, such as a color conversion process, each partial process 39 satisfies a one-to-one dependency relationship. On the other hand, for example, in image processing in which peripheral pixels of a pixel that is a processing target are also necessary, such as a filtering process, a dependency relationship is also assigned to a front-stage partial process 39 of performing image processing with respect to the peripheral pixels. That is, the dependency relationship means a relationship indicating that the partial process 39 of the image processing module 38 connected at the rear stage is executable in a case where the partial process 39 of the image processing module 38 connected at the front stage is terminated between the connected image processing modules 38. Accordingly, each partial process 39 is executable in a case where a partial process 39 assigned with a dependency relationship at a front stage is not present, or in a case where all partial processes 39 assigned with a dependency relationship at a front stage are terminated.

Specifically, for example, a partial process 39A and a partial process 39B shown in FIG. 5 are executable when execution of image processing in the image processing DAG 50B is started. Further, for example, a partial process 39C shown in FIG. 5 is executable in a case where both processes of the partial process 39A and the partial process 39B assigned with a dependency relationship at a front stage are terminated.

Further, the assignment section 62 assigns a priority to each partial process 39 of the image processing DAG 50B. The priority means a priority in executing the partial process 39. Here, in a case where a plurality of partial processes 39 are executable simultaneously, the plurality of partial processes 39 are sequentially executed in a descending order of priorities. For example, as shown in FIG. 6, the assignment section 62 according to this embodiment assigns a priority higher than that of the partial process 39 executed by the image processing DAG 50B connected at the front stage to the partial process 39 executed by the image processing module 38 connected at the rear stage.

Figure 6:
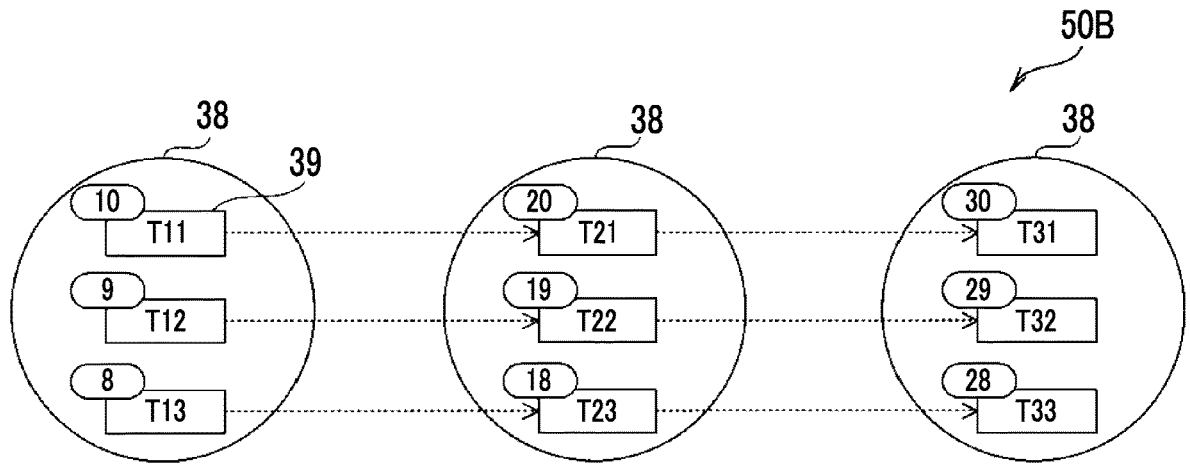
FIG. 6 is a schematic view showing an example of an image processing DAG in which priorities are assigned to partial processes.

An internal character string ("T11" or the like) of each partial process 39 in FIG. 6 is a character string for distinguishing between the respective partial processes 39. Hereinafter, in a case where the respective partial processes 39 are described to be distinguished from each other, an internal character string is assigned to the end thereof, like a partial process T11. Further, a numeral character on an upper left end portion ("10", or the like) of the partial process 39 in FIG. 6 represents a priority assigned to each partial process 39. In this embodiment, an example in which as a value of the numeral character is larger, its priority is higher is shown. The internal character string and the priority of the partial process 39 described in FIG. 6 as an example are similarly applied to examples in FIGS. 7 to 10, and FIGS. 12 and 13 (which will be described later).

Further, the assignment section 62 according to this embodiment assigns a priority based on the priority of the partial process 39 of the image processing module 38 connected at the front stage to the partial process 39 of the image processing module 38 connected at the rear stage, with respect to each partial process 39 assigned with a dependency relationship. For example, as shown in FIG. 6, a case where the assignment section 62 assigns, with respect to partial processes T11, T12, and T13 of the image processing module 38 at the frontmost stage, priorities that become lower in the order of the partial processes T11, T12, and T13 will be described. In this case, the assignment section 62 assigns, with respect to partial processes T21, T22, and T23 of the image processing module 38 at the middle stage, the same ordered priorities as the priorities of the partial processes T11, T12, and T13 at the front stage having a dependency relationship.

Further, the assignment section 62 according to this embodiment assigns a higher priority to a partial process 39 for processing divided image data indicating a divided image disposed in an upper part of an output image in a front view, compared with a partial process 39 for processing divided image data indicating a divided image disposed in a lower part of the output image in the front view. The assignment of the priorities will be described in detail with reference to FIGS. 7 and 8. Hereinafter, it is assumed that "upper", "lower", and "upper and lower" in an image mean "an upper part in a front view", "a lower part in the front view", and "upper and lower parts in the front view" in the image.

Figure 7:
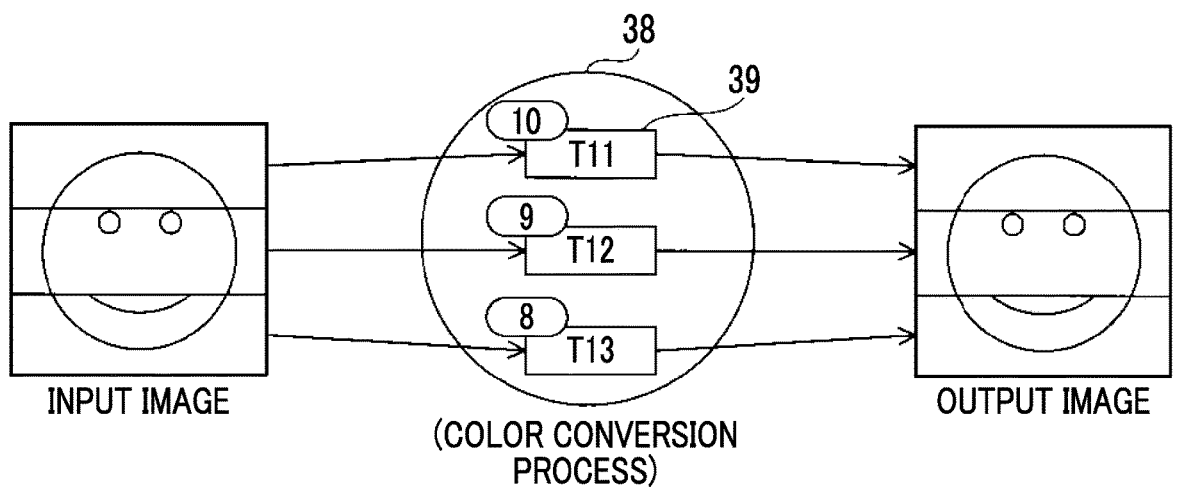
FIG. 7 is a schematic view showing an example of priorities assigned to partial processes in a case where a color conversion process of an image is performed.

For example, as shown in FIG. 7, in the case of image processing in which pixels of an input image and corresponding pixels of an output image are disposed at the same position, as in a color conversion process or the like, the assignment section 62 assigns higher priorities to the partial processes T12 and T11 compared with the partial process T13. Further, in this case, the assignment section 62 assigns a higher priority to the partial process T11 compared with the partial process T12.

Figure 8:
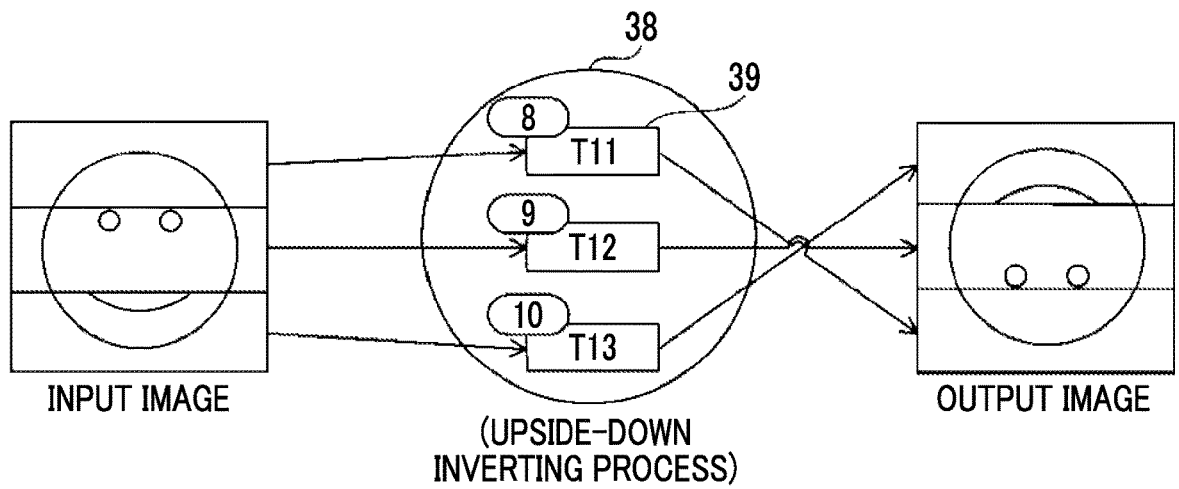
FIG. 8 is a schematic view showing an example of priorities assigned to partial processes in a case where a process of inverting an image upside down is performed.

On the other hand, for example, as shown in FIG. 8, in the case of image processing in which positions of pixels of an input image and positions of pixels a corresponding output image are vertically exchanged, as in a process of inverting an image upside down or the like, the assignment section 62 assigns higher priorities to the partial processes T12 and T13 compared with the partial process T11. Further, in this case, the assignment section 62 assigns a higher priority to the partial process T13 compared with the partial process T12.

Further, in a case where image processing modules 38 that are executed in parallel are present in the image processing DAG 50B, the assignment section 62 according to this embodiment assigns priorities having an alternating processing order to the partial processes 39 of the image processing modules 38 that are executed in parallel.

Figure 9:
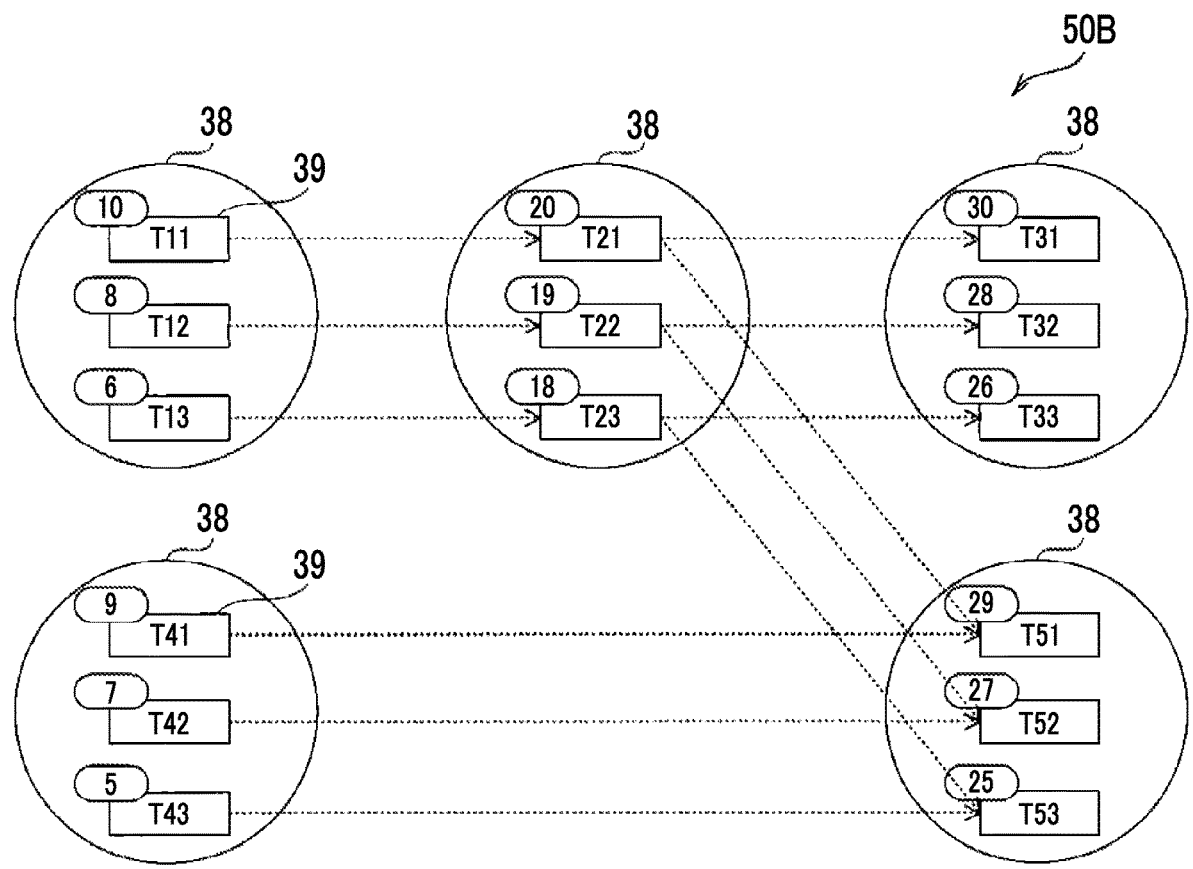
FIG. 9 is a schematic view showing another example of the image processing DAG in which priorities are assigned to partial processes.

For example, as shown in FIG. 9, the assignment section 62 assigns, with respect to the partial processes T11, T12, and T13 and partial processes T41, T42, and T43 assigned with no dependency relationship, priorities that become lower in the order of the partial processes T11, T41, T12, T42, T13, and T43.

The list storage section 64 according to this embodiment includes a storage region of an executable partial process list 66 (which will be described later).

Figure 10:
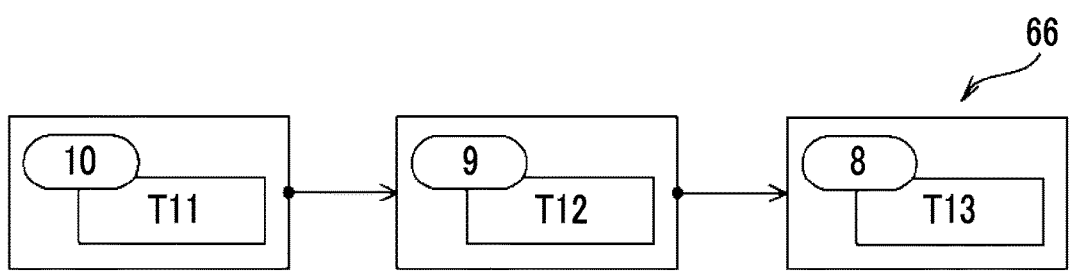
FIG. 10 is a schematic view showing an example of an executable partial process list according to an embodiment.

The registration section 68 according to this embodiment arranges executable partial processes 39 in accordance with assigned priorities on the basis of a dependency relationship assigned between the respective partial processes 39 in accordance with the image processing DAG 50B, and registers the result in the executable partial process list 66. For example, the executable partial process list 66 immediately after execution of image processing in the image processing DAG 50B shown in FIG. 6 is started is shown in FIG. 10.

As shown in FIG. 6, immediately after the execution of the image processing in the image processing DAG 50B is started, the partial processes T11, T12, and T13 of the image processing module 38 at the frontmost stage are executable. That is, as shown in FIG. 10, the registration section 68 arranges the executable partial processes T11, T12, and T13 in an order of partial processes T11, T12, and T13 which is a descending order of priorities, and registers the result in the executable partial process list 66.

The execution section 70 according to this embodiment executes the partial processes 39 in a descending order of priorities in the executable partial process list 66 registered by the registration section 68. In a case where the partial processes 39 are executed, in this embodiment, the execution section 70 causes a calculation section (the first calculation section 12A or the second calculation section 12B) indicated by calculation section information of the image processing module 38 to execute the partial processes 39, for example.

The output section 72 according to this embodiment outputs output image data obtained as a result of image processing executed by the image processing module 38 at the final stage of the image processing DAG 50B. In this embodiment, the output section 72 displays the obtained output image data on the display section 16. The output section 72 may output (transmit) the output image data to an external device. Further, in a case where the computer 10 is embedded in a printer, the output section 72 may output (form) an output image expressed by the output image data on a recording material such as a sheet.

Figure 11:
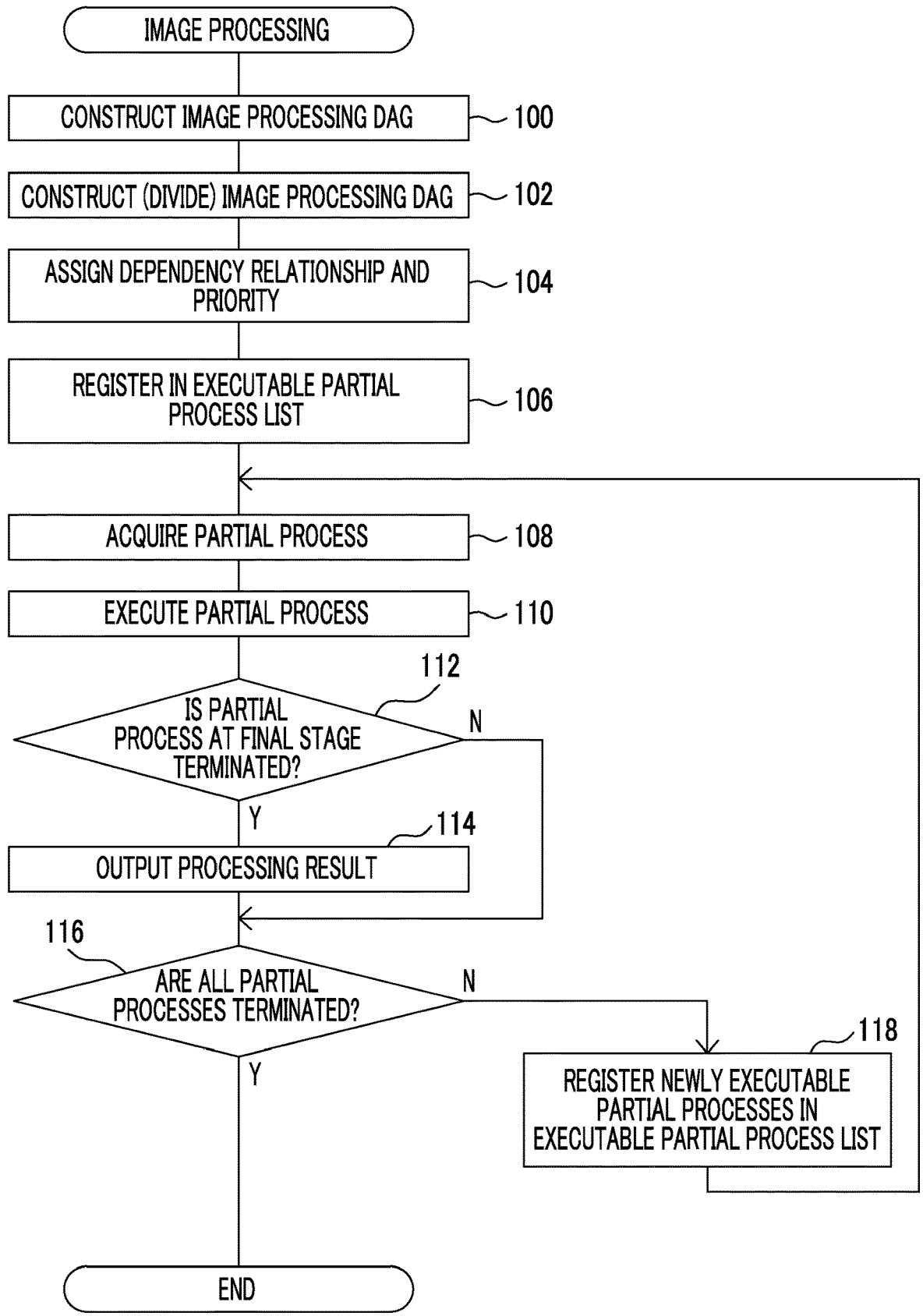
FIG. 11 is a flowchart showing a processing flow of an image processing program according to the embodiment.

Next, an operation of the computer 10 according to this embodiment will be described with reference to FIG. 11. FIG. 11 is a flowchart that shows a processing flow of an image processing program executed by the first calculation section 12A in a case where an instruction for starting execution of image processing is input by the application 32. Further, the image processing program is installed in the storage section 20 in advance. Further, as the first calculation section 12A executes the image processing program, the first calculation section 12A functions as the process construction section 42, the division section 60, the assignment section 62, the registration section 68, the execution section 70, and the output section 72.

In step 100 in FIG. 11, the process construction section 42 constructs the image processing DAG 50A in which image processing instructed by the application 32 is performed in accordance with a construction instruction from the application 32. In the next step 102, the division section 60 divides input image data into a plurality of pieces of divided image data, as described above. Further, the division section 60 divides image processing executed by each image processing module 38 into partial processes 39 corresponding to each piece of divided image data with respect to the image processing DAG 50A constructed in step 100 to construct an image processing DAG 50B.

In the next step 104, the assignment section 62 assigns a dependency relationship between a partial process 39 of the image processing module 38 connected at a front stage and a partial process 39 of the image processing module 38 connected at a rear stage, in accordance with the type of image processing executed by the image processing module 38. Further, the assignment section 62 assigns a priority to each partial process 39 of the image processing DAG 50B, as described above. In the next step 106, as described above, the registration section 68 arranges executable partial processes 39 on the basis of the dependency relationship assigned in step 104 in accordance with the assigned priorities, and registers the result in the executable partial process list 66.

In the next step 108, the execution section 70 acquires a partial process 39 corresponding to a parallel degree indicating a predetermined number of partial processes 39 that are executed in parallel from the head of the executable partial process list 66, and deletes the acquired partial process 39 from the executable partial process list 66. In the next step 110, the execution section 70 causes a calculation section indicated by calculation section information of the image processing module 38 including the partial processes 39 acquired in step 108 to execute the acquired partial processes 39.

In the next step 112, the execution section 70 determines whether partial processes 39 of the image processing module 38 at the final stage of the image processing DAG 50B are included in the partial processes 39 that are executed in step 110 and then is terminated. The execution section 70 causes the procedure to proceed to step 116 in a case where the determination is negative, and causes the procedure to proceed to step 114 in a case where the determination is affirmative.

In the step 114, the output section 72 outputs output image data output by the partial processes 39 of the image processing module 38 at the final stage of the image processing DAG 50B to the display section 16, and then, the procedure proceeds to step 116. In step 116, the execution section 70 determines whether execution of all the partial processes 39 in the image processing DAG 50B is terminated. The execution section 70 causes the procedure to proceed to step 118 in a case where the determination is negative.

In step 118, the registration section 68 registers newly executable partial processes 39 in the executable partial process list 66 on the basis of the dependency relationship of the image processing DAG 50B, and then, the procedure returns to step 108. In the registration, the registration section 68 registers the partial processes 39 at positions where the partial processes 39 in the executable partial process list 66 are arranged in accordance with priorities even after the registration of the newly executable partial processes 39, using an arrangement method such as a binary insertion sort. On the other hand, the execution section 70 terminates the present image processing in a case where the determination in step 116 is affirmative.

Figure 12:
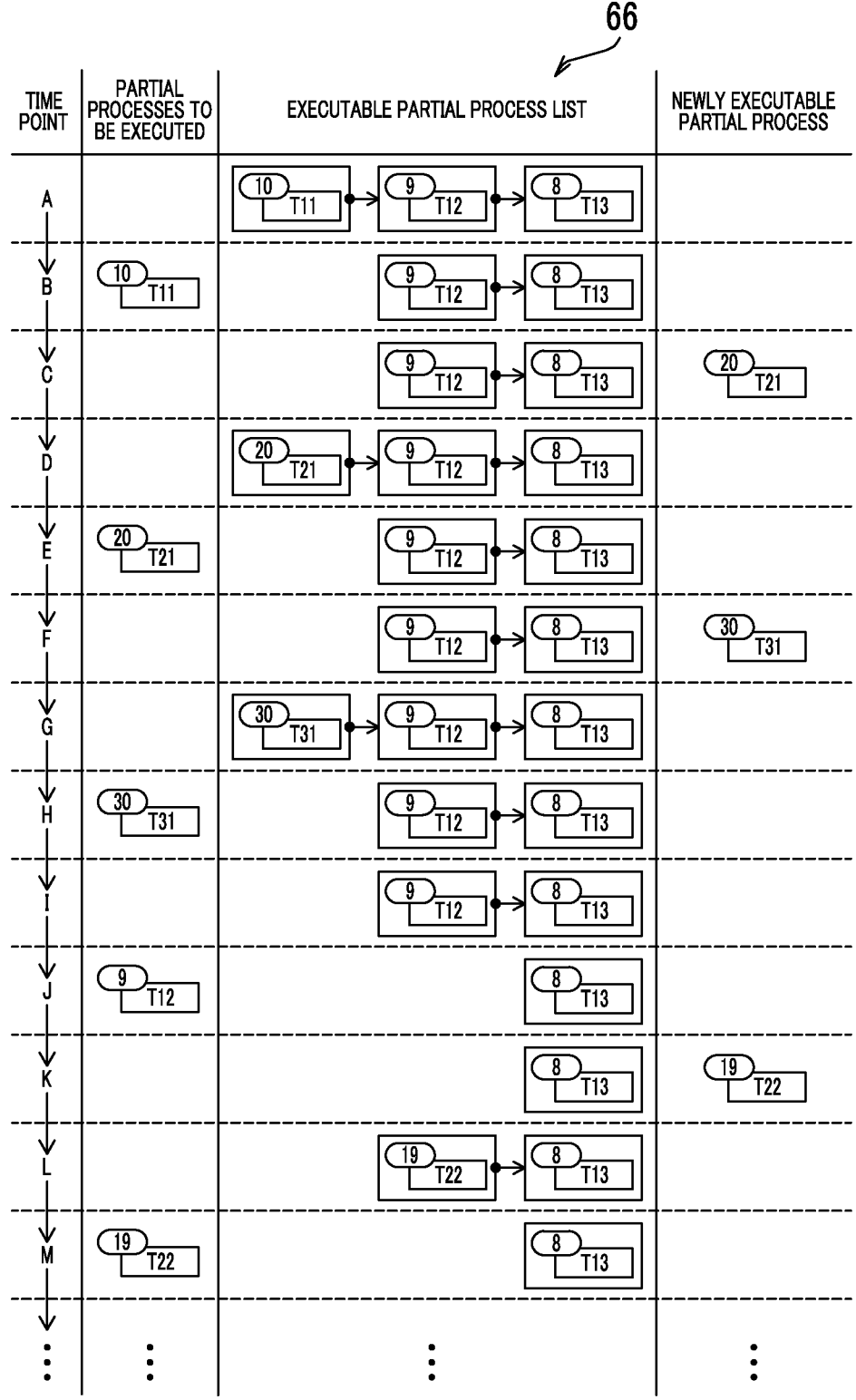
FIG. 12 is a schematic view showing an example of a time-series transition of image processing in an image processing DAG according to the embodiment.
Figure 13:
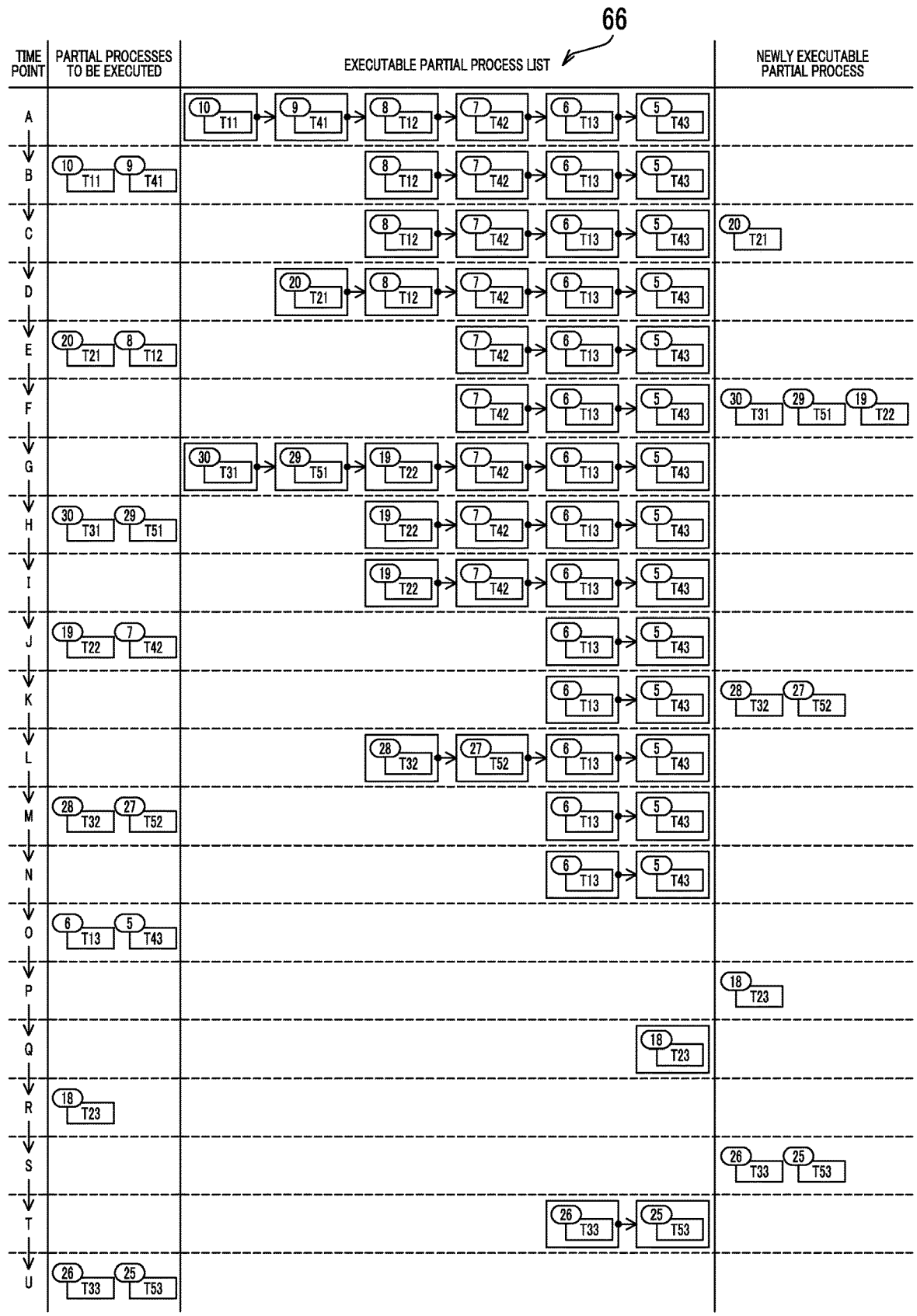
FIG. 13 is a schematic view showing another example of the time-series transition of image processing in the image processing DAG according to the embodiment.

Next, a time-series transition of the partial processes 39 to be executed, the executable partial process list 66, and the newly executable partial processes 39 using the above-described image processing program will be described with reference to FIGS. 12 and 13. FIG. 12 shows a time-series transition in a case where image processing is performed with a parallel degree of "1", in accordance with the image processing DAG 50B shown in FIG. 6. Further, FIG. 13 shows a time-series transition in a case where image processing is performed with a parallel degree of "2", in accordance with the image processing DAG 50B shown in FIG. 9. In addition, for ease of description, it is assumed that executions of partial processes 39 to be executed in parallel in FIG. 13 (for example, partial processes T11 and T41 to be executed at a time point B) are simultaneously terminated.

As shown in FIG. 12, at a time point A immediately after execution of image processing in the image processing DAG 50B shown in FIG. 6 is started, executable partial processes 39 are registered in the executable partial process list 66 as follows. That is, at the time point A, the partial processes T11, T12, and T13 are arranged in the order of the partial processes T11, T12, and T13 in a descending order of priorities, and are registered in the executable partial process list 66, through the process of step 106.

At the next time point B, the partial process T11 corresponding to a value of a parallel degree (here, "1") is acquired from the head of the executable partial process list 66, and is then deleted, through the process of step 108. Further, through the process of step 110, the acquired partial process T11 is executed. At a time point C when the execution of the partial process T11 is terminated, a partial process T21 is newly executable. At the next time point D, through the process of step 118, the partial process T21 is registered at the head of the executable partial process list 66 in accordance with an assigned priority.

At the next time point E, through the process of step 108, the partial process T21 corresponding to the value of the parallel degree is acquired from the head of the executable partial process list 66, and is then, deleted. Further, through the process of step 110, the acquired partial process T21 is executed. At a time point F when the execution of the partial process T21 is terminated, the partial process T31 is newly executable. At the next time point G, through the process of step 118, the partial process T31 is registered at the head of the executable partial process list 66 in accordance with an assignment priority. Since the same process is repeatedly performed thereafter, description thereof will not be repeated.

On the other hand, as shown in FIG. 13, at a time point A immediately after the execution of the image processing in the image processing DAG 50B shown in FIG. 9 is started, the executable partial processes 39 are registered in the executable partial process list 66 as follows. That is, at the time point A, through the process of step 106, the partial processes T11 to T13 and T41 to T43 are arranged in the order of the partial processes T11, T41, T12, T42, T13, and T43 in a descending order of priorities, and are registered in the executable partial process list 66.

At the next time point B, the partial processes T11 and T41 corresponding to a value of a parallel degree (here, "2") are acquired from the head of the executable partial process list 66, and are then deleted, through the process of step 108. Further, through the process of step 110, the acquired partial processes T11 and T41 are executed. At a time point C when the execution of the partial processes T11 and T41 are terminated, the partial process T21 is newly executable. At the next time point D, through the process of step 118, the partial process T21 is registered at the head of the executable partial process list 66 in accordance with an assigned priority.

At the next time point E, through the process of step 108, the partial processes T21 and T12 corresponding to a value of the parallel degree are acquired from the head of the executable partial process list 66, and are then deleted. Further, through the process of step 110, the acquired partial processes T21 and T12 are executed. At a time point F when the execution of the partial processes T21 and T12 are terminated, the partial processes T22, T31, and T51 are newly executable. At the next time point G, through the process of step 118, the partial processes T31, T51, and T22 are registered at the head of the executable partial process list 66 in the order of the partial processes T31, T51, and T22, in accordance with assigned priorities. Since the same processes are repeatedly performed thereafter, description thereof will not be repeated.

As described above, according to this embodiment, a dependency relationship of processes is assigned to partial processes 39 between connected image processing modules 38, and a priority is assigned to each partial process 39. Further, executable partial processes 39 are arranged in accordance with assigned priorities on the basis of the dependency relationship, and are registered in the executable partial process list 66. Further, the partial processes 39 are executed in a descending order of priorities in the executable partial process list 66.

In execution of image processing, in a case where executable processes are selected through an object group in which a plurality of objects are connected to each other in a DAG form, the amount of calculation for selecting the executable processes becomes O(n) in a case where the number of target objects to be traced is n. On the other hand, in this embodiment, executable partial processes 39 are arranged in accordance with assigned priorities, and are registered in the executable partial process list 66. In a case where image processing is executed, since the partial processes 39 registered in the executable partial process list 66 are acquired from the head for execution, the amount of calculation is O(1). Accordingly, according to this embodiment, in a case where a plurality of executable processes are present, it is possible to select executable processes while suppressing reduction in processing efficiency. The above-mentioned O(n) and O(1) are based on an O scheme, which represent the amount of calculation (order).

Further, according to this embodiment, a higher priority compared with the partial process 39 executed by the image processing module 38 connected at the front stage is assigned to the partial process 39 executed by the image processing module 38 connected at the rear stage. As a result, for example, a possibility that the partial processes 39 for processing divided image data in the same region, such as the partial processes T11, T21, and T31, are continuously executed becomes high. In this case, a temporal locality in a storage region to be accessed between the partial processes 39 increases, and thus, a possibility that image processing is executed at high speed becomes high. Accordingly, according to this embodiment, in a case where a plurality of executable processes are present, it is possible to select executable processes while suppressing reduction in processing efficiency.

Further, according to this embodiment, with respect to each partial process 39 assigned with a dependency relationship, a priority based on the priority of the partial process 39 of the image processing module 38 connected at the front stage is assigned to the partial process 39 of the image processing module 38 connected at the rear stage. As a result, for example, a possibility that the partial processes 39 for processing divided image data in the same region, such as the partial processes T11, T21, and T31, are continuously executed becomes high. In this case, a temporal locality in a storage region to be accessed between the partial processes 39 increases, and thus, a possibility that image processing is executed at high speed becomes high. Accordingly, according to this embodiment, in a case where a plurality of executable processes are present, it is possible to select executable processes while suppressing reduction in processing efficiency.

Further, according to this embodiment, in a case where image processing modules 38 executed in parallel in the image processing DAG 50B are present, priorities having an alternating processing order are assigned to the partial processes 39 between the image processing modules 38 executed in parallel. As a result, for example, as in the partial processes T11, T21, and T31, a possibility that image processing is terminated in a divided image data unit without waiting for termination of all the partial processes 39 of the image processing modules 38 including the partial processes T11, T12, and T13 becomes high. In this case, without waiting for termination of all the partial processes 39 of each image processing module 38, it is possible to delete divided image data from a storage region for each partial process 39 in which image processing is terminated. Accordingly, according to this embodiment, it is possible to reduce the amount of a used storage region.

Further, according to this embodiment, a higher priority is assigned to a partial process 39 for processing divided image data indicating a divided image disposed in an upper part of an output image in a front view, compared with a partial process 39 for processing divided image data indicating a divided image disposed in a lower part of the output image in the front view. Thus, the partial process 39 for processing the divided image data indicating the divided image disposed on the upper part in the front view is terminated earlier than the partial process 39 for processing the divided image data indicating the divided image disposed on the lower part in the front view.

In general, display of an image on a display section and formation of an image on a recording material such as a sheet are usually performed by raster scanning. In this embodiment, since the partial process 39 for processing divided image data indicating a divided image disposed at an upper part in a front view is early terminated, it is possible to sequentially output the divided images from the upper part in the front view. Accordingly, according to this embodiment, by sequentially outputting output image data starting from the partial process 39 in which the processing is terminated without waiting for termination of all the partial processes 39 of the image processing modules 38 at the final stage of the image processing DAG 50B, it is possible to reduce a time necessary for image processing including output of an image.

In the above-described embodiment, a case where different priorities are assigned to respective partial processes 39 has been described, but the invention is not limited thereto. A configuration in which the same priority is assigned to some of the partial processes 39. In the case of this configuration example, a configuration in which partial processes 39 assigned with the same priority are executed in a registration order in the executable partial process list 66 may be used, for example.

Further, a method for assigning priorities to the partial processes 39 is not limited to the example shown in the above-described embodiment. For example, a configuration in which priorities are assigned to the partial processes 39 in accordance with calculation section information may be used. In the case of this configuration example, for example, in a case where the second calculation section 12B has a higher speed performance of image processing compared with the first calculation section 12A, the following configuration may be used, for example. That is, in this case, a configuration in which priorities of the partial processes 39 of an image processing module 38 executed by the second calculation section 12B are higher than priorities of the partial processes 39 of the image processing module 38 executed by the first calculation section 12A may be used, for example.

In the above-described embodiment, a case in which image processing in the image processing module 38 is executed by a calculation section indicated by calculation section information has been described, but the invention is not limited thereto. For example, as in three connected image processing modules 38 in the upper part in FIG. 9, a configuration in which image processing in the image processing modules 38 that perform image processing with respect to the same image is executed by the same calculation section may be used.

Further, in the embodiment, an aspect in which various programs are stored (installed) in the storage section 20 in advance has been described, but the invention is not limited thereto. The various programs may be provided in a form of being recorded on a recording medium such as a CD-ROM, a digital versatile disk read only memory (DVD-ROM), or a universal serial bus (USB). In addition, the various programs may be provided in a form of being downloaded from an external device through a network.

This application is based on JP2016-060524, filed on Mar. 24, 2016, the disclosure of which is incorporated herein by reference.

All documents, patent applications and technical standard written in this specification are incorporated herein by reference to the same degree as in a case where each of the documents, the patent applications, and the technical standards is specifically and individually written to be incorporated by reference.

What is claimed is:

1. An image processing apparatus that performs a partial process with respect to each piece of divided image data obtained by dividing an input image expressed by input image data into partial regions using each object of an object group in which a plurality of objects for executing image processing are connected to each other in a directed acyclic graph form, comprising:
an assignment section that assigns a dependency relationship of processes to the partial processes between the connected the objects and assigns a priority to each partial process;
a registration section that arranges executable partial processes that are executable on the basis of the dependency relationship in accordance with the assigned priorities and registers the result in an executable partial process list; and
an execution section that executes the partial processes in a descending order of the priorities in the executable partial process list registered by the registration section
wherein the assignment section assigns a higher priority to the partial process executed by the object connected at a rear stage compared with the partial process executed by the object connected at a front stage;
the divided image data is image data indicating divided images obtained by dividing the input image in a vertical direction in a front view, and
the assignment section assigns a higher priority to a partial process for processing divided image data indicating a divided image disposed in an upper part of an output image in the front view, compared with a partial process for processing divided image data indicating a divided image disposed in a lower part of the output image in the front view.

2. The image processing apparatus according to claim 1, wherein in a case where a partial process of the object connected at the front stage is terminated between the connected objects, the dependency relationship is a relationship indicating that a partial process of the object connected at the rear stage is executable.

3. The image processing apparatus according to claim 1, wherein the assignment section assigns a priority based on the priority of the partial process of the object connected at the front stage to the partial process of the object connected at the rear stage, with respect to each partial process having the dependency relationship.

4. The image processing apparatus according to claim 1, wherein in a case where objects that are executed in parallel are present in the object group, the assignment section assigns priorities having an alternating processing order to partial processes between the objects that are executed in parallel.

5. An image processing method comprising:
assigning a dependency relationship of processes to partial processes between objects of an object group and assigning a priority to each of the partial process, the object group comprising a plurality of objects for executing image processing being connected to each other in a directed acyclic graph form;
arranging executable partial processes that are executable on the basis of the dependency relationship in accordance with the assigned priorities and registering the result in an executable partial process list; and
executing, by each of the objects of the object group, the partial processes in a descending order of the priorities in the registered executable partial process list with respect to each piece of divided image data obtained by dividing an input image expressed by input image data into partial regions, wherein the divided image data is image data indicating divided images obtained by dividing the input image in a vertical direction in a front view, the assigning comprises assigning a higher priority to a partial process for processing divided image data indicating a divided image disposed in an upper part of an output image in the front view, compared with a partial process for processing divided image data indicating a divided image disposed in a lower part of the output image in the front view; and the assigning comprises assigning a higher priority to the partial process executed by the object connected at a rear stage compared with the partial process executed by the object connected at a front stage.

6. A non-transitory storage medium storing a program that causes a computer to execute an image processing, the image processing comprising:

assigning a dependency relationship of processes to partial processes between objects of an object group and assigning a priority to each of the partial process, the object group comprising a plurality of objects for executing image processing being connected to each other in a directed acyclic graph form;

arranging executable partial processes that are executable on the basis of the dependency relationship in accordance with the assigned priorities and registering the result in an executable partial process list; and executing, by each of the objects of the object group, the partial processes in a descending order of the priorities in the registered executable partial process list with respect to each piece of divided image data obtained by dividing an input image expressed by input image data into partial regions, wherein the divided image data is image data indicating divided images obtained by dividing the input image in a vertical direction in a front view, the assigning comprises assigning a higher priority to a partial process for processing divided image data indicating a divided image disposed in an upper part of an output image in the front view, compared with a partial process for processing divided image data indicating a divided image disposed in a lower part of the output image in the front view; and the assigning comprises assigning a higher priority to the partial process executed by the object connected at a rear stage compared with the partial process executed by the object connected at a front stage.

* * * * *